United States Patent [19]

Schwoegler

[11] 4,134,775

[45] Jan. 16, 1979

[54] COMPOSITIONS OF SULFUR AND FLY ASH AND SHAPED ARTICLES PRODUCED THEREFROM

[76] Inventor: Edward J. Schwoegler, 7533 State Line Ave., Munster, Ind. 46321

[21] Appl. No.: 771,580

[22] Filed: Feb. 24, 1977

[51] Int. Cl.² ............................................. C09K 15/02
[52] U.S. Cl. .................................. 106/286.8; 106/69; 106/287.32; 106/70; 106/71; 106/DIG. 1
[58] Field of Search ................ 106/69, 70, 71, 287 R, 106/287 SC, DIG. 1, 119

[56] References Cited

U.S. PATENT DOCUMENTS

| | | | |
|---|---|---|---|
| 1,693,714 | 12/1928 | Kobbe' | 106/70 |
| 3,206,319 | 9/1965 | Minnick et al. | 106/119 |
| 3,421,911 | 1/1969 | Greco et al. | 106/70 |
| 3,453,125 | 7/1969 | Williams | 106/287 SC |
| 4,025,352 | 5/1977 | Leutner et al. | 106/70 |

Primary Examiner—Hosea E. Taylor
Assistant Examiner—W. Thompson
Attorney, Agent, or Firm—Roylance, Abrams, Berdo & Farley

[57] ABSTRACT

Shaped articles are produced from compositions of sulfur and a particulate inorganic material, at least 10% by weight of the particulate inorganic material being fly ash. The initial compositions are uniform dry blends, and the finished products are formed by converting the sulfur of the composition to molten form and then cooling while, as in casting, the molten material is confined in the desired shape. Use of fly ash provides articles having a hardness more than twice that of sulfur alone and a compressive strength approaching three times that of a typical aged poured concrete.

9 Claims, No Drawings

COMPOSITIONS OF SULFUR AND FLY ASH AND SHAPED ARTICLES PRODUCED THEREFROM

BACKGROUND OF THE INVENTION

It has long been proposed to produce shaped articles by casting of molten elemental sulfur with an inorganic material as a particulate filler. The production of such articles is disclosed, for example, in U.S. Pat. Nos. 4,266,053, issued Oct. 17, 1882, to Joseph J. Sachs, and 1,693,714, issued Dec. 4, 1928, to William H. Kobbe. Such articles have been successfully used in various applications, particularly to secure wrought iron pieces in masonry. In general, however, prior art practices have yielded articles of relatively poor hardness and strength, and shaped sulfur articles have achieved only a relatively limited commercial acceptance.

OBJECTS OF THE INVENTION

A general object is to provide three-dimensional articles of sulfur having improved hardness and strength characteristics.

Another object is to provide shaped sulfur articles which can be used as structural elements, such as bricks, building blocks, moldings, cornices and the like, as well as for joining structural elements and securing piling and other in-ground and underground structures.

A further object is to provide shaped sulfur articles having hardness and strength characteristics superior to those of concrete.

Yet another object is to provide novel compositions which are convertible into such shaped articles.

SUMMARY OF THE INVENTION

Articles according to the invention are in the form of a 3-dimensional matrix of solidified elemental sulfur having uniformly distributed therethrough a particulate inorganic material which amounts to 20–80% of the weight of the article, at least 10% by weight of the inorganic material being fly ash, and the inorganic material having a particle size such that the average maximum particle dimension is 0.0005–10.0 mm. It is advantageous to employ fly ash as the sole inorganic particulate material, with the fly ash amounting to 20–60%, and for best results to 40–60%, of the total weight of the article, peak hardness values being obtained when the weight of the fly ash is approximately equal to that of the sulfur. The invention also includes dry blends and fused compositions from which such articles can be formed. Finished articles according to the invention may be independent articles, such as bricks and cornices, or cast-in-place articles, such as the joint between a wrought iron piece and a masonry structure.

DETAILED DESCRIPTION OF THE INVENTION

Articles according to the invention can be produced by mixing sulfur and the inorganic particulate material at, e.g., room temperature, introducing the mixture into a mold, applying heat to the mold to render the sulfur completely molten, and then cooling the mold until the sulfur has solidified. Assuming that the initial mixing operation is carried out to produce a uniform dry blend, the resulting product is characterized by a uniform distribution of the particulate material through the sulfur, the tendency toward non-uniformity which has resulted from prior art attempts to blend the particulate material into molten sulfur being avoided.

Dry blends of powdered sulfur and particulate solid additive inorganic materials, with at least 10% of the additive material weight being fly ash and with the total additive material amounting to 20–80% of the total weight of the dry blends are novel and useful compositions but have the disadvantage that, when packages of the dry blends are shipped and stored as commercial products, settling and stratification occurs so that the dry blend becomes non-uniform and must be remixed before use. It is therefore particularly advantageous to subject the dry blends to heat to fuse the sulfur and to form the resulting plastic composition into small integral bodies each consisting of the inorganic particulate additive material distributed uniformly through a solid sulfur matrix. Thus, for example, the dry blend can be extruded into rods of, e.g., 2.5 mm. diameter, the rods being cooled and then broken into small pieces. Other pelletizing procedures can be employed. Such a product can be bagged and sold commercially with assurance that the product received by the ultimate user will be uniform.

Best strength and hardness characteristics of the solidified article are attained when all of the inorganic particulate material employed is fly ash. However, so long as at least 10% by weight of the inorganic particulate material is fly ash, other particulate inorganic materials can be employed. Suitable other particular materials are diatomaceous earth, limestone, taconite, vermiculite (both ore and expanded), perlite (both ore and expanded), mica, magnesia, dolomite, volcanic ash, bottom ash, slag, expanded slag, magnesite, silicates, bauxite, corundum, garnet, phsophates, zeolites, asbestos, feldspar, sandstone, crushed concrete, crushed glass, clay, and the like.

Any fly ash produced by burning solid fossil fuel such as bituminous coal, anthracite coal or lignite can be employed. So-called modified fly ash, resulting when limestone or dolomite is injected into the combustion zone for reaction with the sulfur gases present in the combustion gas, can also be used. The fly ash should be in its native form, i.e., unfragmented, and as such comprises generally spherical particles substantially all of which are in the range of 0.0005–0.25 mm. in size. When one or more particulate inorganic additive materials other than fly ash is employed, that material should be of such fineness that the average maximum particle dimension thereof is in the range of 0.0005–10.0 mm., with the particle size being so selected, relative to the size of the finished article, that the maximum particle size is small in comparison to the smallest dimension of the finished article.

Composition embodiments of the invention require presence of a total of 20–80%, based on total weight of the composition, of additive material, at least 10% by weight of which must be fly ash. In the most advantageous compositions, all of the inorganic particulate additive material is fly ash and, in that event, the fly ash constitutes 20–60% of the total composition weight, with 40–60% fly ash being superior, and about 50% being best.

EXAMPLE 1

The effect of varying the proportion of fly ash in articles comsisting of a matrix of solidified elemental sulfur with fly ash distributed therethrough as the sole inorganic particulate material was determined by subjecting twelve articles of different fly ash content to a scratch hardness test.

Test Apparatus and Procedure

The apparatus employed included a scratch blade 0.32 cm. wide, the tip being rounded to provide a curved tip edge, and the curved edge being sharpened to a knife edge condition. The blade was rigidly secured to a flat rigid plastic panel so as to project a short distance at right angles from the plane of the panel. A guide board was employed to constrain the combination of the panel and blade to a horizontal path across the test sample without accepting any of the weight of the panel and blade. The tests were carried out by adding weights to the panel until the blade made a cut 0.4 mm. deep in the sample, the weight in grams necessary to achieve that result being recorded as the hardness index.

Test Specimen Preparation

All specimens were prepared from elemental sulfur and a typical (not fragmented) fly ash recovered by precipitation from flue gas resulting from burning bituminous coal, the fly ash retaining its spherical particle form and having a tamped bulk density of about 1.13. The sulfur and fly ash were combined and subjected to mild stirring at room temperature to provide a uniform dry blend which was then placed in a metal mold equipped with a heating mantle. Heat was applied until the sulfur was completely molten, the mold then cooled to room temperature and the resulting article removed for testing.

Scratch Hardness Test Results

The identity for each of the twelve test specimens, and the hardness index, are tabulated below:

| Test Specimen | Sulfur/Fly Ash Weight Ratio | Hardness Index (grams) |
|---|---|---|
| 1 | 3:5:8 | Note 1 |
| 2 | 4:8 | 122 |
| 3 | 5:8 | 200 |
| 4 | 6:8 | 457 |
| 5 | 7:8 | 752 |
| 6 | 8:8 | 790 |
| 7 | 10:8 | 700 |
| 8 | 12:8 | 695 |
| 9 | 18.7:8 | 690 |
| 10 | 32.8 | 440 |
| 11 | 72.8 | 305 |
| 12 | 100% sulfur | 295 |

Note 1. This specimen was still in the form of a powder after melting of the sulfur and cooling.

Maximum hardness was thus achieved when equal amounts of sulfur and fly ash were used, and further increasing the proportion of sulfur resulted in a decrease in hardness, though the 20% fly ash content of Specimen 10 still provided a substantial increase in hardness.

EXAMPLE 2

The procedure of Example 1 was repeated, using a diatomaceous earth ground to a particle size approximating that of the fly ash used in Example 1. The hardness test results are tabulated below:

| Test Specimen | Sulfur/Diatomaceous Earth Weight Ratio | Hardness Index (grams) |
|---|---|---|
| 13 | 6:5 | Note 1 |
| 14 | 8:5 | Note 2 |
| 15 | 12:5 | 228 |
| 16 | 14:5 | 327 |
| 17 | 16:5 | 716 |
| 18 | 18:5 | 457 |
| 19 | 20:5 | 295 |
| 20 | 100% sulfur | 295 |

Note 1. This sample was still in the form of a powder after melting of the sulfur and cooling.
Note 2. This sample was semi-granular.

Though, as in the case of fly ash in Example 1, the hardness peaked with an increasing proportion of sulfur, the peak did not occur until the sulfur content was increased to about 76% by weight (16:5), a value markedly above the 50% by weight required for maximum hardness with fly ash.

EXAMPLE 3

The effect of including fly ash on the compressive strength of hardened sulfur articles was determined, using a standard Tinius-Olsen hydrostatic test apparatus. The test specimens based on elemental sulfur were prepared according to Example 1, and all test specimens were standard 1 in. × 1 in. × 1¾ in. (height) pieces. The results are tabulated below:

| Test Specimen | Inorganic Particulate Ingredient | Ingredient Weight (grams) | Sulfur Weight (grams) | Compressive Strength (lbs./sq. in.) |
|---|---|---|---|---|
| 21 | Fly ash | 539.5 | 539.5 | 9560 |
| 22 | Slag[2] | 566.0 | 566.0 | 3400 |
| 23 | Sharp sand | 700.0 | 700.0 | 3020 |
| 24 | Fly ash + slag[2] | 350.0[3] | 700.0 | 6450 |
| 25 | Concrete block segment | — | — | 4790 |
| 26 | Segment of aged poured concrete | — | — | 3340 |

[1]Common fly ash, not fragmented
[2]Finely divided expanded slag, all through a 1 sq. mm. screen
[3]Each ingredient It will be noted that Specimen 21, consisting of 50% sulfur and 50% fly ash by weight, exhibited a test strength almost twice that of the concrete block segment and approaching three times that of the aged poured concrete specimen. While the strength of Specimen 22, using only expanded slag as the particulate material, was only approximately equal to that for the aged poured concrete segment (Specimen 26), replacing 50% of the weight of slag with fly ash (Specimen 24) resulted in a strength approaching twice that of the aged poured concrete segment. The test results thus demonstrate that markedly greater strength is attained using only fly ash as the particulate material and employing equal amounts of fly ash and sulfur, and that including a significant proportion of fly ash will markedly increase the strength when inorganic materials other than fly ash are used. In this latter regard, it is to be noted that the strength improvement obtained by replacing 50% of the slag of Specimen 22 with fly ash is approximately in direct proportion to the amount of fly ash included, i.e., the 6450 psi value for Specimen 24 is approximately half the difference between the values for Specimens 22 and 21.

EXAMPLE 4

The results of the hardness and strength determinations of Examples 1–3 demonstrate the advantages of fly ash, both as the sole particulate ingredient of a sulfur article and as a particulate material for upgrading the strength of sulfur articles including any of a wide variety of inorganic particulate materials other than fly ash. In view of those results, the invention embraces the following typical formulations:

| Formulation | Sulfur (Parts by Wt.) | Inorganic Particulate Material (Parts by Wt.) | | |
|---|---|---|---|---|
| | | Fly Ash | Other Than Fly Ash | |
| | | | Identity | Parts by Wt. |
| A | 65.0 | 35.0 | — | — |
| B | 65.0 | 17.5 | Expanded slag | 17.5 |
| C | 65.0 | 3.5 | Expanded slag | 31.5 |
| D | 65.0 | 17.5 | Diatomaceous earth | 17.5 |
| E | 65.0 | 3.5 | Diatomaceous earth | 31.5 |
| F | 65.0 | 17.5 | Sharp sand | 17.5 |
| G | 65.0 | 17.5 | Crushed concrete | 17.5 |
| H | 65.0 | 17.5 | Crushed glass | 17.5 |
| I | 65.0 | 17.5 | Limestone | 17.5 |
| J | 65.0 | 17.5 | Bottom ash | 17.5 |
| K | 65.0 | 17.5 | Vermiculite | 17.5 |
| L | 65.0 | 3.5 | Vermiculite | 31.5 |
| M | 50.0 | 25.0 | Diatomaceous earth | 25.0 |
| N | 50.0 | 25.0 | Crushed concrete | 25.0 |
| O | 50.0 | 25.0 | Crushed glass | 25.0 |
| P | 50.0 | 25.0 | Bauxite | 25.0 |
| Q | 50.0 | 25.0 | Clay | 25.0 |
| R | 50.0 | 25.0 | Taconite | 25.0 |
| S | 50.0 | 30.0 | Sharp sand | 20.0 |
| T | 30.0 | 60.0 | Sharp sand | 10.0 |
| U | 30.0 | 35.0 | Expanded slag | 35.0 |
| V | 20.0 | 40.0 | Diatomaceous earth | 40.0 |
| W | 20.0 | 60.0 | Diatomaceous earth | 20.0 |
| X | 20.0 | 40.0 | Expanded slag | 40.0 |
| Y | 20.0 | 60.0 | Expanded slag | 20.0 |
| Z | 20.0 | 80.0 | — | — |

It is thus apparent that the ability of common fly ash to increase the hardness and strength of shaped bodies of cooled molten elemental sulfur makes it possible to include in such bodies substantial proportions of inexpensive inorganic particulate materials, many of which presently represent a disposal problem.

EXAMPLE 5

A conventional laboratory scale screw operated plastics extruder is equipped with an extrusion die having a single orifice 2.5 mm. In diameter, the die and barrel of the extruder being equipped with heating mantles. The extruder is arranged to extrude directly into a cold water bath and a rotary knife is provided at the die orifice to cut the extruded rod into pieces 3.5 mm. long. A uniform dry blend of equal parts by weight of powdered sulfur and bituminous fly ash is supplied to the extruder hopper and the extruder operated at an average barrel temperature of 160° C. and a die temperature of 120° C. The extruded product is recovered from the water bath in the form of hardened pellets each consisting of a solidified sulfur matrix with the fly ash particles distributed uniformly therethrough. The product can be packaged in bags for shipment and handling and is suitable for sale to the house repair trade for use in repairing masonry, mounting the uprights of iron railings in brickwork, and for like purposes.

What is claimed is:

1. An article useful as a structural member, a joint between other members, and for purposes requiring hardness and strength, said article consisting essentially of a three-dimensional matrix of solidified sulfur; and
solid particulate inorganic material distributed through said matrix,
said particulate inorganic material amounting to 20–80% of the weight of the article,
at least a portion of said particulate inorganic material being non-fragmented fly ash, said fly ash amounting to 20-60% of the weight of the article,
the particle size of said particulate inorganic material being in the range of 0.0005-10.0 mm. and the maximum particle size being small in comparison to the minimum dimension of the article;
the article having a hardness significantly greater than that of solidified sulfur along, and a compressive strength superior to that of aged poured concrete.

2. An article according to claim 1, wherein
all of said particulate inorganic material is fly ash; and
the fly ash amounts to 20-60% of the weight of the article.

3. An article according to claim 2, wherein
the fly ash amounts to approximately 50% of the weight of the article; and
the article has a hardness at least twice that of a like article produced from sulfur alone.

4. A composition consisting essentially of a uniform dry blend of sulfur; and
at least one solid particulate inorganic material,
said particulate inorganic material amounting to 20-80% of the total composition weight, at least a portion of said particulate inorganic material being nonfragmented fly ash, said fly ash amounting to 20-60% of the weight of the article,
the particles of said particulate inorganic material being in the range of 0.0005–10.0 mm.;
the composition being convertable into shaped articles useful as structural members, joints between other members, and for other purposes, by melting the sulfur and cooling the molten sulfur while said particulate inorganic material is distributed therethrough, such articles having a hardness significantly greater than that of solidified sulfur and a compressive strength superior to aged poured concrete.

5. A composition according to claim 4, wherein
all of said particulate inorganic material is fly ash,
the fly ash amounting to 20-60% of the weight of the composition.

6. A composition according to claim 5, wherein
the fly ash amounts to approximately 50% of the weight of the composition.

7. A composition of matter in the form of small, discrete solid bodies, each body consisting essentially of
a matrix of solidified sulfur; and
solid inorganic particulate material distributed throughout said matrix and constituting 30–80% of the weight of the body,
at least a portion of said solid inorganic particulate material being fly ash, said fly ash amounting to 20–60% of the weight of the article,
the particle size of said solid inorganic particulate material being in the range of 0.0005-10.0 mm. and the maximum particle size being small in comparison to the size of the body.

8. A composition according to claim 7, wherein
all of said solid inorganic particulate material is fly ash and the fly ash amounts to 20-60% of the weight of the body.

9. A composition according to claim 8, wherein
the fly ash amounts to approximately 50% of the weight of the body.

* * * * *